United States Patent
Hanson

(10) Patent No.: US 11,071,079 B2
(45) Date of Patent: Jul. 20, 2021

(54) SYNCHRONIZING MULTIPLE-INPUT/MULTIPLE-OUTPUT SIGNALS IN DISTRIBUTED ANTENNA SYSTEMS

(71) Applicant: Andrew Wireless Systems GmbH, Buchdorf (DE)

(72) Inventor: Van E. Hanson, Forest, VA (US)

(73) Assignee: Andrew Wireless Systems GmbH, Buchdorf (DE)

( * ) Notice: Subject to any disclaimer, the term of this patent is extended or adjusted under 35 U.S.C. 154(b) by 19 days.

(21) Appl. No.: 15/575,757

(22) PCT Filed: Dec. 15, 2015

(86) PCT No.: PCT/IB2015/059644
§ 371 (c)(1),
(2) Date: Nov. 20, 2017

(87) PCT Pub. No.: WO2016/185261
PCT Pub. Date: Nov. 24, 2016

(65) Prior Publication Data
US 2018/0124729 A1    May 3, 2018

Related U.S. Application Data

(60) Provisional application No. 62/164,986, filed on May 21, 2015.

(51) Int. Cl.
*H04W 56/00* (2009.01)
*H04W 88/08* (2009.01)

(52) U.S. Cl.
CPC ..... *H04W 56/0025* (2013.01); *H04W 56/004* (2013.01); *H04W 56/0045* (2013.01); *H04W 56/0065* (2013.01); *H04W 88/085* (2013.01)

(58) Field of Classification Search
CPC ........... H04W 56/0025; H04W 56/004; H04W 56/0045; H04W 56/0065; H04W 88/085
See application file for complete search history.

(56) References Cited

U.S. PATENT DOCUMENTS 6,717,960 B1 * 4/2004 Anesko ............... H04L 12/5601
370/395.7
7,292,665 B2 * 11/2007 Eglit ..................... H04L 7/0054
375/354

(Continued)

FOREIGN PATENT DOCUMENTS

CN    101098328 A    1/2008
CN    101754269 A    6/2010

(Continued)

OTHER PUBLICATIONS

International Searching Authority, "International Search Report from PCT Application No. PCT/IB2015/059644 filed Dec. 15, 2015", "from Foreign Counterpart of U.S. Appl. No. 62/164,986", dated Mar. 10, 2016, pp. 1-13, Published in: WO.

(Continued)

*Primary Examiner* — Gregory B Sefcheck
*Assistant Examiner* — Joshua Smith
(74) *Attorney, Agent, or Firm* — Fogg & Powers LLC

(57) ABSTRACT

The present disclosure describes devices, systems, and methods for synchronizing multiple-input/multiple-output ("MIMO") signals or other signals in telecommunication systems. Some aspects may involve transmitting signals between a head-end unit and remote units of a telecommunication system. A first delay of a signal path between the head-end unit and a first remote unit of the remote units may be determined to be greater than each delay of signal paths between the head-end unit and other remote units. Based on the first delay, the telecommunication system may be configured to delay transmission of additional signals such that (Continued)

the additional signals are simultaneously transmitted to another unit by either the head-end unit or the remote units.

17 Claims, 6 Drawing Sheets

(56) References Cited

U.S. PATENT DOCUMENTS

| | | | |
|---|---|---|---|
| 9,370,025 B1* | 6/2016 | Singh | H04W 36/08 |
| 2004/0057543 A1* | 3/2004 | Huijgen | H04J 3/0682 |
| | | | 375/356 |
| 2006/0120395 A1* | 6/2006 | Xing | H04B 7/0613 |
| | | | 370/431 |
| 2006/0233111 A1* | 10/2006 | Wright | H04B 17/0087 |
| | | | 370/241 |
| 2009/0116420 A1 | 5/2009 | Jeong et al. | |
| 2009/0253451 A1* | 10/2009 | Trachewsky | H04W 4/14 |
| | | | 455/509 |
| 2010/0002651 A1* | 1/2010 | Hofmann | H04W 36/02 |
| | | | 370/331 |
| 2011/0200051 A1 | 8/2011 | Rivaud et al. | |
| 2012/0075996 A1* | 3/2012 | Wan William Lau | |
| | | | H04L 12/1859 |
| | | | 370/235.1 |
| 2013/0272233 A1* | 10/2013 | Dinan | H04W 72/0406 |
| | | | 370/329 |
| 2013/0301694 A1* | 11/2013 | Olgaard | H04B 7/0413 |
| | | | 375/224 |
| 2014/0372623 A1* | 12/2014 | Chen | H04L 47/30 |
| | | | 709/231 |
| 2015/0003565 A1 | 1/2015 | George et al. | |
| 2015/0012773 A1* | 1/2015 | Katsumata | H04L 47/283 |
| | | | 713/401 |
| 2015/0036608 A1* | 2/2015 | Morita | H04L 1/1887 |
| | | | 370/329 |
| 2015/0195381 A1* | 7/2015 | Huang | H04L 43/16 |
| | | | 370/241 |

FOREIGN PATENT DOCUMENTS

| | | |
|---|---|---|
| CN | 101877633 A | 11/2010 |
| CN | 103220775 A | 7/2013 |
| CN | 104468014 A | 3/2015 |
| EP | 0901720 A1 | 3/1999 |
| EP | 0901720 B1 | 3/2000 |
| EP | 1223699 A2 | 7/2002 |
| WO | 9804052 A1 | 1/1998 |

OTHER PUBLICATIONS

China National Intellectual Property Administration, "First Office Action from CN Application No. 2015/80079177.8", from Foreign Counterpart to U.S. Appl. No. 15/575,757, filed Dec. 3, 2019, pp. 1-11, Published: CN.

European Patent Office, "Communication pursuant to Article 94(3) from EP Application No. 15820628.4", from Foreign Counterpart to U.S. Appl. No. 15/575,757, filed Apr. 9, 2020, pp. 1-6, Published: EP.

China National Intellectual Property Administration, "Second Office Action from CN Application No. 201580079177.8", from Foreign Counterpart to U.S. Appl. No. 15/575,757, filed May 19, 2020, p. 1 through 11, Published: CN.

* cited by examiner

SYNCHRONIZING MULTIPLE-INPUT/MULTIPLE-OUTPUT SIGNALS IN DISTRIBUTED ANTENNA SYSTEMS

CROSS-REFERENCE TO RELATED APPLICATIONS

This application is a U.S. National Stage application of PCT Application Serial No. PCT/IB2015/059644, filed 15 Dec. 2015 and titled "SYNCHRONIZING MULTIPLE-INPUT/MULTIPLE-OUTPUT SIGNALS IN TELECOMMUNICATIONS SYSTEMS," which claims benefit to U.S. Provisional Application Ser. No. 62/164,986, filed May 21, 2015 and titled "Synchronizing Multiple-Input/Multiple-Output Signals in Distributed Antenna Systems," the contents of all of which are hereby incorporated herein by reference.

TECHNICAL FIELD

The present disclosure relates generally to telecommunications and, more particularly (although not necessarily exclusively), to synchronizing multiple-input/multiple-output signals in distributed antenna systems.

BACKGROUND

Examples of a telecommunication system may include a distributed antenna system ("DAS"), a repeater, or a radio access network. The telecommunication system can be communicatively coupled to base stations, such as (but not limited to) an eNodeB that is compliant with a Long Term Evolution ("LTE") standard.

The telecommunication system can be used to provide wireless communication coverage in a variety of environments, particularly in large structures such as office buildings, convention halls, airports, stadiums, and the like. A DAS, for example, can include one or more head-end units (e.g., master units) that are communicatively coupled to one or more base stations. The DAS can also include multiple remote units that are communicatively coupled to a head-end unit. The remote units, each of which can include one or more transceivers and antennas, can be distributed across a coverage area. The remote units can transmit downlink signals from a base station to mobile phones or other terminal devices in coverage areas serviced by the remote units. Remote units can also receive uplink signals from terminal devices and transmit the uplink signals to the head-end unit.

SUMMARY

The present disclosure describes devices, systems, and methods for synchronizing multiple-input/multiple-output ("MIMO") signals or other signals in telecommunication systems.

In some aspects, a method is provided. The method can involve transmitting signals between a head-end unit and remote units of a telecommunication system. The method can further involve determining that a first delay of a signal path between the head-end unit and a first remote unit of the remote units is greater than each delay of signal paths between the head-end unit and other remote units. The method can further involve configuring, based on the first delay, the telecommunication system to delay transmission of additional signals such that the additional signals are simultaneously transmitted to another unit by either the head-end unit or the remote units.

In other aspects, a telecommunication system is provided. The telecommunication system can include remote units, a head-end unit, and a processing device. The remote units may transmit downlink signals to terminal devices as well as receive uplink signals from the terminal devices. The head-end unit can distribute the downlink signals to the remote units as well as receive the uplink signals from the remote units. The processing device may determine that a first delay of a signal path between the head-end unit and a remote unit is greater than each delay of the other signal paths between the head-end unit and other remote units. The processing device may also instruct, based on the first delay, the telecommunication system to delay the transmission of additional MIMO signals such that the additional MIMO signals are simultaneously transmitted to another unit by either the head-end unit or remote units.

In other aspects, a non-transitory computer-readable medium is provided having instructions stored thereon that are executable by a processing device to perform operations. The operations may include determining that a first delay of a signal path between a head-end unit in a telecommunication system and a first remote unit is greater than each of the other delays of other signal paths between the head-end unit and other remote units. The determination may be based on time stamps included in Ethernet-framed data transmitted between the head-end unit and remote units. The operation may further include configuring, based on the first delay, the telecommunication system to delay transmission of additional Ethernet-framed data representing a set of MIMO signals such that the additional Ethernet-framed data are simultaneously transmitted to another device by either the head-end unit or remote units.

The details of one or more aspects and examples are set forth in the accompanying drawings and the description below. Other features and aspects will become apparent from the description, the drawings, and the claims.

DETAILED DESCRIPTION

Figure 1:
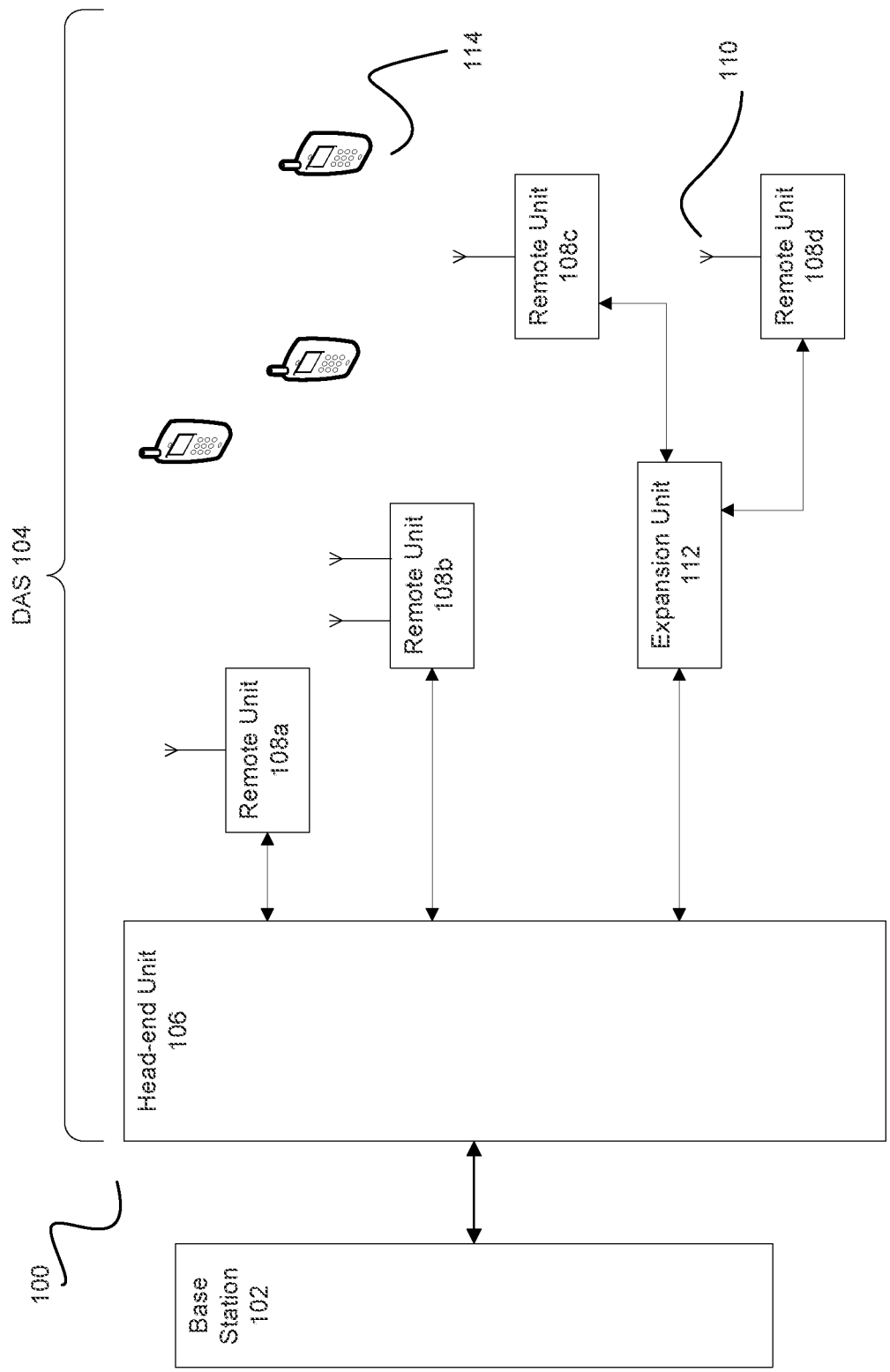
FIG. 1 shows a block diagram of an example of a telecommunication system that includes a distributed antenna system ("DAS") communicatively coupled to a base station according to one aspect of the present disclosure.

Certain aspects and features of the present disclosure relate to synchronizing signals in a telecommunication system. In some examples, the delay associated with each signal path between a head-end unit and each remote unit is determined. The telecommunication system can delay the transmissions of the signals transmitted on signal paths with less delay than the transmission with the greatest delay to equalize the delay across signal paths and synchronize the transmission of the signals from the remote units.

A telecommunication system can be any type of system for extending wireless coverage. Examples of a telecommunication system include a distributed antenna system ("DAS"), a repeater, or a radio access network. In some aspects, a base station that is included in or communicatively coupled to a telecommunication system can configure downlink signals to have a certain delay. A head-end unit can be communicatively coupled to a base station from which the downlink signals are received.

Telecommunication systems that include multiple-input/multiple-output ("MIMO") capabilities can use multiple antennas to transmit data to a terminal device (e.g., a mobile communication device) and can use multiple antennas to receive data from the terminal device. Each signal in a set of MIMO signals may be transmitted from a given antenna element simultaneously (or nearly simultaneously) with the other transmit signals in the set of MIMO signals being transmitted from the respective antenna elements. Some transmission modes may specify that a difference in transmission time between signals transmitted at different antenna elements should be less than a certain amount of time, such as 65 nanoseconds.

Simultaneously transmitting a set of MIMO signals may present difficulties. For example, a head-end unit may receive a set of MIMO signals from a base station. Each signal in the MIMO set may be provided to a different remote unit of the telecommunication system for transmission to a terminal device that receives the MIMO set. Differences in the downlink signal paths between the head-end unit and the remote units may cause different downlink delays. For example, a first MIMO signal provided to a first remote unit for transmission may be delayed by a different amount than a second MIMO signal provided to a second remote unit for transmission. The difference in downlink delays may result from different propagation delays in communication media that communicatively couple the remote units to the head-end unit. The difference in downlink delays may also result from processing performed by different components of different downlink paths from the head-end unit to the remote units, or from other reasons.

A telecommunication system according to some examples can synchronize the transmission of signals in a MIMO set. A delay can be determined for each signal path between the input of the head-end unit and the transmit antennas at each remote unit. A longest delay can be identified from these delays, and signals traversing each signal path can be delayed by the difference between the longest delay and the delay associated with each signal path. In this manner, a telecommunication system can be configured, based on one or more identified delays of certain signals, to delay transmission of certain other signals such that the various signals are simultaneously transmitted from one or more units (e.g., components or devices such as a head-end unit, a remote unit, or a terminal device) to one or more other units unit (e.g., components or devices such as a head-end unit, a remote unit, or a terminal device) in a downlink direction, an uplink direction, or both.

In some aspects, by delaying the signals traversing the signal paths so that these signals have the same or similar delay as signals traversing the signal path with the longest delay, downlink MIMO signals can be synchronized such that they are transmitted by different remote units simultaneously. For example, downlink MIMO signals can be synchronized for simultaneous transmission to one or more terminal devices.

FIG. 1 depicts an example of a telecommunication system 100. The telecommunication system 100 depicted in FIG. 1 includes a DAS 104 communicatively coupled to a base station 102 according to some aspects. Although a DAS 104 is depicted in FIG. 1 as an example, other types of telecommunication systems, such as a repeater or a radio access network, can be used. The base station 102 can be used by one or more telecommunication providers. The DAS 104 includes a head-end unit 106 communicatively coupled to the base station 102. Although one head-end unit and one base station are depicted, any number of head-end units and base stations may be included.

The DAS 104 also includes four spatially separated remote units 108a-d that are communicatively coupled to the head-end unit 106. An expansion unit 112 may be included to extend to remote unit 108c and remote unit 108d. Although the DAS 104 includes four remote units 108a-d and one expansion unit 112, any number of remote units and expansion units may be included. The remote units 108a-d can be transceiving devices that include, or are communicatively coupled to, one or more antennas 110. A non-limiting example of a remote unit 108a-d is a universal access point ("UAP"). The remote units 108a-d can provide signal coverage in one or more coverage zones of the DAS. Different sets of remote units 108a-d can service different terminal devices 114 in coverage zones served by the DAS 104.

The base station 102 (e.g., an eNodeB of a Long-Term Evolution "LTE" telecommunication system) can use the DAS 104 to communicate with the terminal devices 114. The head-end unit 106 can receive downlink signals from the base station 102 and distribute downlink signals in analog or digital format to remote units 108a-d for transmission to terminal devices 114 within coverage zones serviced by the remote units 108a-d.

Devices in the DAS 104 can be communicatively coupled via digital links using one or more suitable protocols. For example, the DAS 104 can include Ethernet links between the head end unit 106 and one or more remote units 108a-d for sending data in Ethernet frames. The Ethernet links used for transmitting this Ethernet-framed data can include wireless connections, wired connections, or a combination of wired and wireless connections.

In some aspects, each remote unit 108a-d may be communicatively coupled to the head-end unit 106 via a respective Ethernet link. The DAS 104 can use IEEE 1588 (or another protocol) to set time references in the remote units 108a-d relative to the head-end unit. IEEE 1588 can provide time stamps that identify transmission times, receipt times, or some combination thereof for Ethernet-framed data.

Transmission paths exist between head-end unit 106 and each remote unit 108a-d. Each transmission path may cause different delays on signals traversing the transmission paths. For example, a delay may exist due to the communication medium between the devices or processing circuits within each device. A combination of multiple delays along a transmission path can be referred to as a total delay. In some examples, the total delay may be different for uplink signals and downlink signals along the same transmission path. In other examples, the total downlink delay and total uplink delay may be the same.

In some aspects, an appropriate amount of delay can be added to each delay path to equalize the total delay along each transmission path. Equalizing the total delay can allow the signals traversing different signal paths to be transmitted simultaneously from multiple receiving devices. For example, a suitable processing device (e.g., a processing device in the head-end unit 106) can identify the longest total downlink delay from the set of total downlink delays. The head-end unit 106, expansion unit 112, one or more of remote unit 108a-d, or some combination thereof can delay downlink signals that traverse some downlink paths such that the signals are transmitted by the remote units simultaneously. For example, a programmable delay for a given downlink path can be implemented by using a buffer or other suitable memory device to pause or otherwise delay transmission of one or more data packets through the DAS 104. The additional delay to these downlink signals can equalize the downlink delays across multiple downlink paths used to transmit signals in a MIMO set. As a result, MIMO signals transmitted to multiple remote units 108a-d may be transmitted simultaneously by each remote unit 108a-d to, for example, one or more terminal devices.

Figure 2:
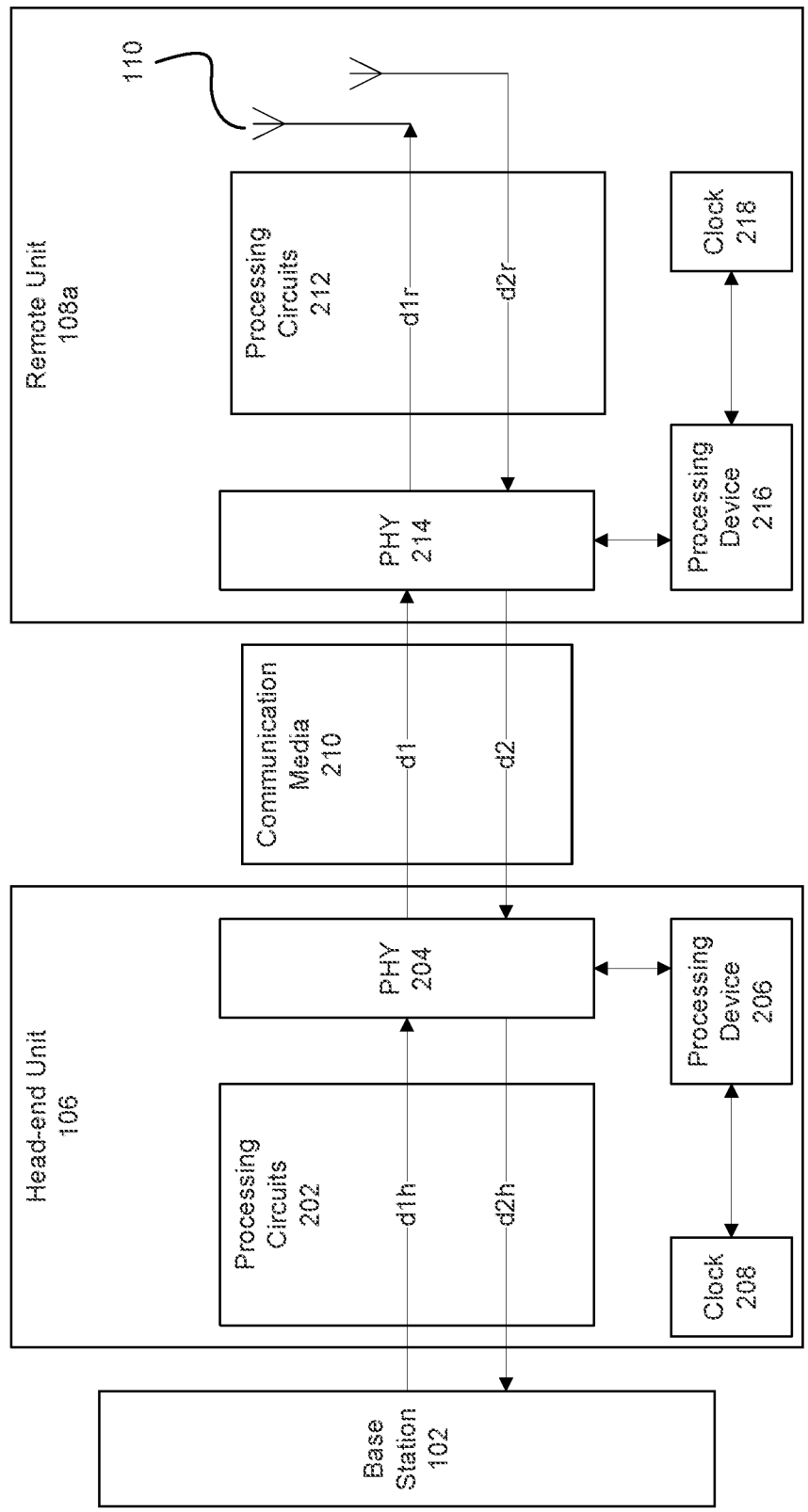
FIG. 2 shows a block diagram of an example of downlink delays in a DAS according to one aspect of the present disclosure.

FIG. 2 depicts an example of downlink delays in downlink transmissions with respect to the head-end unit 106 and remote unit 108a of FIG. 1. A processing device 206 in the head-end unit 106 can set a clock 208 in the head-end unit 106. The clock 208 may be a real-time clock such that it is based on time rather than a counter based on a processor's clock speed. The clock 208 may be set using, for example, an external master clock source using IEEE 1588, a GPS receiver, a time reference received from the connected base station 102, etc. A processing device 216 in the remote unit 108a can set a clock 218 in the remote unit 108a. The clock 218 may also be a real-time clock and may be set in the same ways as the clock 208. The clock 218 can also be set relative to clock 318. For example, the processing device 216 can set the clock 218 at the remote unit 108a using IEEE 1588. Using IEEE 1588 can allow multiple networked devices to synchronize the associated clocks to one "grandmaster" time reference.

The processing device 206 can configure a physical layer device 204 in the head-end unit 106 to communicate signals using the clock 208 as a time reference. The processing device 216 can configure a physical layer device 214 in the remote unit 108a to communicate signals using the clock 318 as a time reference. An example of a physical layer device is an Ethernet transceiver. The signals may be communicated across a communication media 210 that introduces a propagation delay.

To determine the propagation delay, the head-end unit 106 can transmit a message to remote unit 108a. The message can instruct the remote unit 108a to send a responsive message at time t1. The head-end unit 106 can record the time t2 at which the message is received. The downlink propagation delay d1 (which may be equal to the uplink propagation delay d2) can be the difference between the time t1 at which the remote unit 108a transmits the responsive message and the time t2 at which the head-end unit 106 receives the responsive message.

The downlink delay may also include processing delays resulting from signal processing circuits 202, 212 in downlink paths. The processing delays may occur in the head-end unit 106 in signal processing circuits 202 or in the remote unit 108a in the signal processing circuits 212. Examples of delays associated with signal processing circuits 202, 212 include a downlink remote processing delay d1r (associated with signal processing circuits 212), a downlink head-end processing delay d1h (associated with signal processing circuits 202), an uplink remote processing delay d2r (associated with signal processing circuits 212), and an uplink head-end processing delay d2h (associated with signal processing circuits 202).

One or more of delays d1r, d1h, d2r, and d2h can be known or approximated by knowledge of the circuits used to process the signals. For example, a processing device may identify a delay associated with one or more operations performed in the signal path. These operations can include, for example, down-converting an RF signal received from base station 102 to an intermediate frequency, digitizing the received signal, filtering the received signal, etc. The processing delay can be identified by pre-installation testing, by a testing process performed by one or more processing devices included in or communicatively coupled to the installed DAS 104, or some combination thereof. Information about processing delays can be stored in a computer-readable medium that is accessible to a processing device involved in the MIMO synchronization process. The delay information can be used by the processing device to determine a total downlink delay for a given downlink path.

The head-end unit 106 can calculate the total downlink delay of a downlink signal (e.g., a MIMO signal) from the input of a head-end unit 106 to a transmit antenna 110 at each remote unit 108a-d. For example, the total downlink delay for the remote unit 108a can be the sum of propagation delay d1, downlink remote processing delay d1r, and downlink head-end processing delay d1h. The longest total downlink delay from the set of total downlink delays can be used to delay the transmission of signals in the same MIMO set such that all signals in the MIMO set are transmitted simultaneously.

Figure 3:
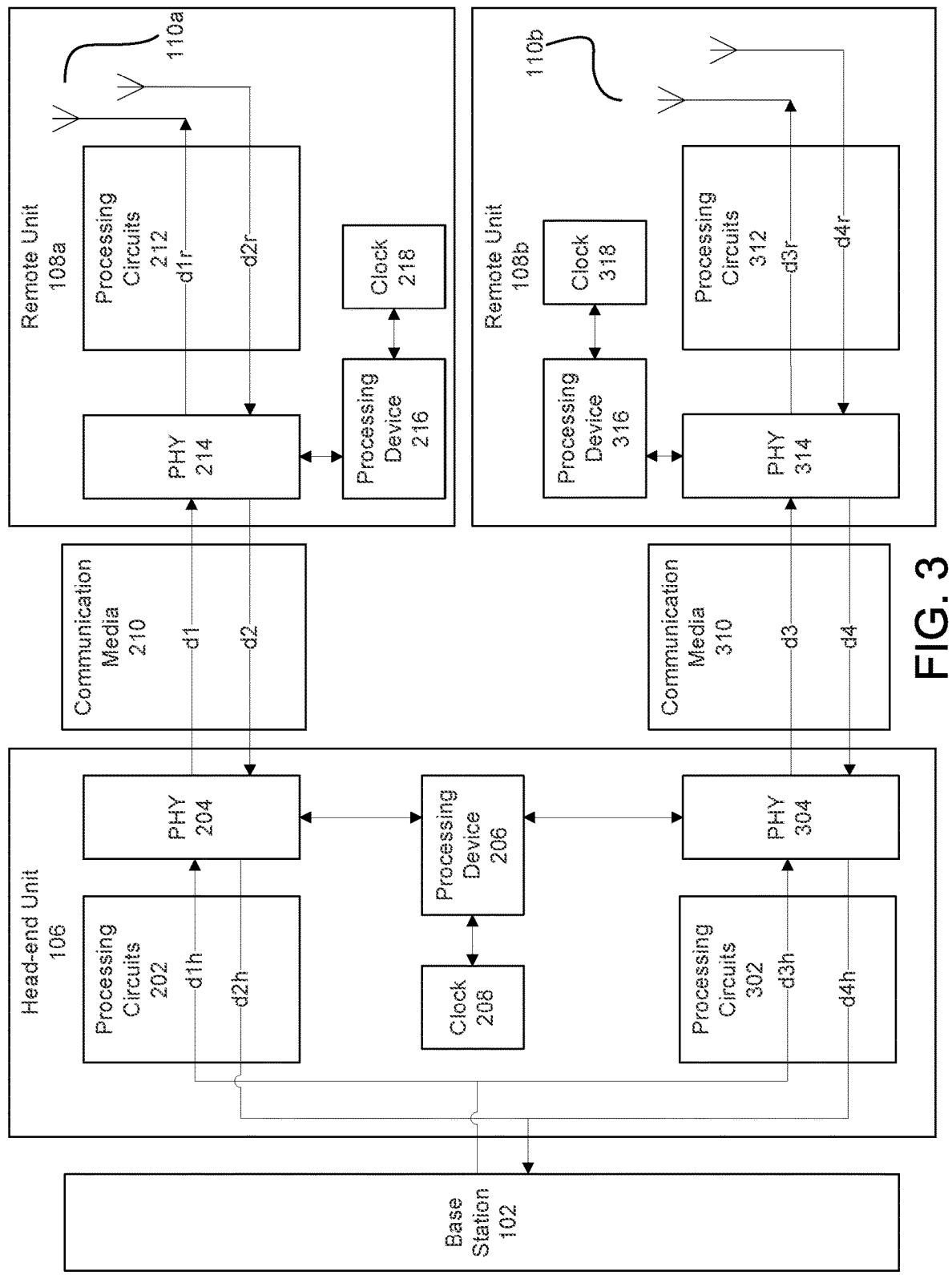
FIG. 3 shows a block diagram of an example of downlink delays in a DAS that can be used to synchronize transmissions according to one aspect of the present disclosure.

FIG. 3 depicts a more detailed block diagram of some of the devices in telecommunication system 100 from FIG. 1 and FIG. 2. Specifically, FIG. 3 depicts the head-end unit 106 communicatively coupled to two remote units 108a-b and corresponding transmission paths between the units.

The remote unit 108b includes a processing device 316 and a clock 318 that may be a real-time clock. The processing device 206 can configure a physical layer device 304 in the head-end unit 106 to communicate signals to remote unit 108b using the clock 208 as a time reference. The processing device 316 can configure a physical layer device 314 in the remote unit 108b to communicate signals using the clock 318 as a time reference. The signals may be communicated across a communication media 310 that introduces a propagation delay.

The downlink delay ("drau1") for the downlink path between the input of the head-end unit 106 and the transmit antenna 110a can be calculated as drau1=d1r+d1h+d1. The downlink delay ("drau3") for the downlink path between the input of the head-end unit 106 and the antenna 110b can be calculated as drau3=d3r+d3h+d3. If drau1 is greater than drau3, the programmable downlink delay for the path to remote unit 108b can be set to drau1-drau3. If drau1 is less than drau4, the programmable delay for the path to remote unit 108a can be set to drau3-drau1. A complementary procedure can be performed in the uplink direction.

Figure 4:
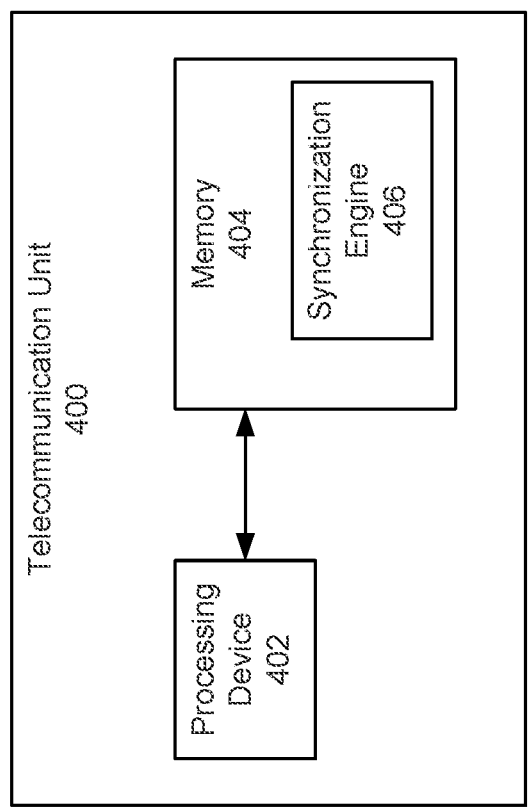
FIG. 4 is a block diagram of an example of a telecommunication unit that can perform a synchronization process on a telecommunication system according to one aspect of the present disclosure.

FIG. 4 is a block diagram depicting an example of a telecommunication unit 400 that can perform a synchronization process on a telecommunication system. In some examples, the telecommunication unit 400 can be included in one or more of a head-end unit, an expansion unit, a remote unit, a DAS controller, etc. The telecommunication unit 400 can include a processing device 402 and a memory 404. The processing device 402 can be communicatively coupled to the memory 404. The processing device 402 can include any number of processors configured for executing program code stored in the memory 404. Examples of the processing device 402 include a microprocessor, an application-specific integrated circuit ("ASIC"), a field-programmable gate array ("FPGA"), or other suitable processor. The memory 404 can include, for example, a non-transitory computer-readable medium.

Program code stored in the memory 404 can include a synchronization engine 406 that can be executed by the processing device 402. The synchronization engine 406 can include one or more algorithms for synchronizing MIMO transmissions.

Figure 5:
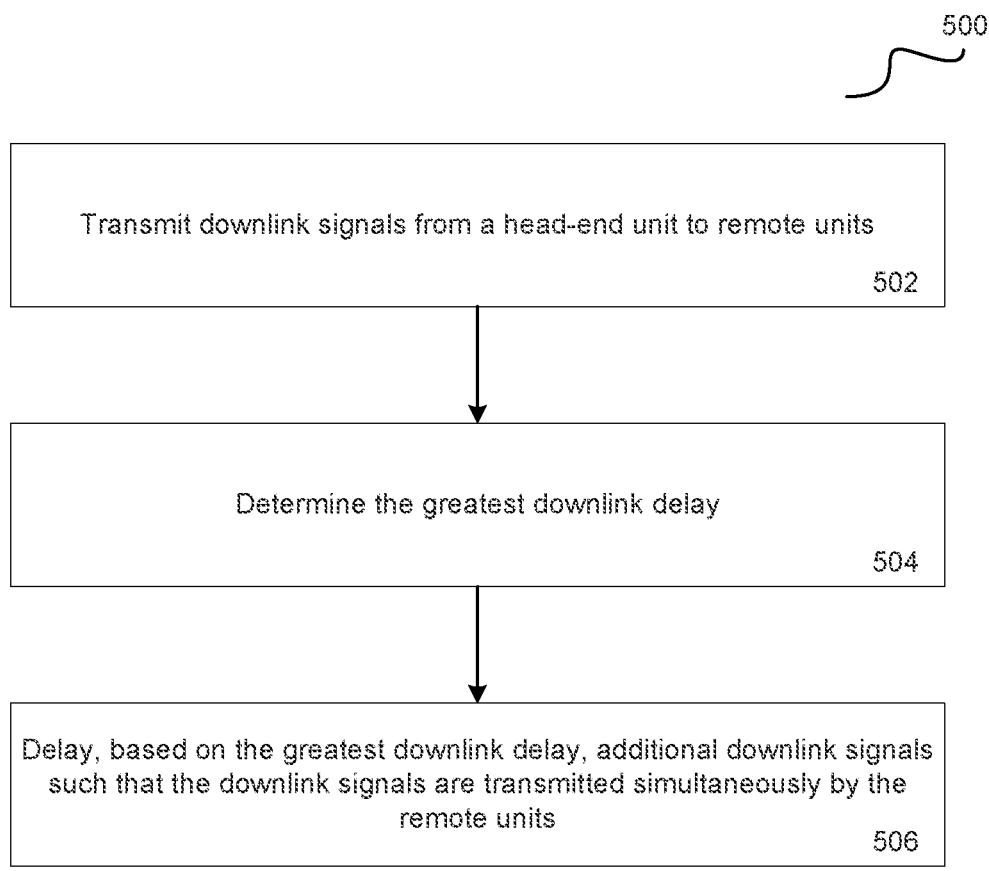
FIG. 5 shows a flow chart of a process for synchronizing transmissions in a DAS based on a greatest downlink delay according to one aspect of the present disclosure.

FIG. 5 depicts a process 500 for synchronizing downlink signals in a telecommunication system. The process of FIG. 5 is described with reference to transmission paths between a head-end unit and remote units, but other implementations are possible. Furthermore, FIG. 5 depicts a process 500 related to downlink signals along downlink paths, but the process may be applied to uplink signals along uplink paths.

In block 502, a head-end unit transmits downlink signals to remote units. Although block 502 describes a single head-end unit transmitting downlink signals to remote units, some examples may include any number of head-end units, remote units, and expansion units transmitting signals in the uplink or downlink direction to any number of other head-end units, remote units, and expansion units. In some aspects, the downlink signals may include data in Ethernet frames representing signals from a base station or other signal source. In some aspects, the downlink signals may be MIMO signals. The downlink signals may be transmitted over any suitable communication media (e.g., copper wire, optical fiber, a wireless link, etc.).

In block 504, a head-end unit determines the greatest downlink delay among the remote units. In some examples, the greatest downlink delay can be determined by comparing the delay on downlink signals among different signal paths. In other examples, the greatest downlink delay may be approximated by comparing the delay on uplink signals among different signal paths. In some aspects, the greatest downlink delay may include delays from the propagation delay as well as the processing circuits in either or both of the head-end unit and remote unit. This may be referred to as the greatest total downlink delay. An example of a process for determining the greatest downlink delay is described in FIG. 6.

Figure 6:
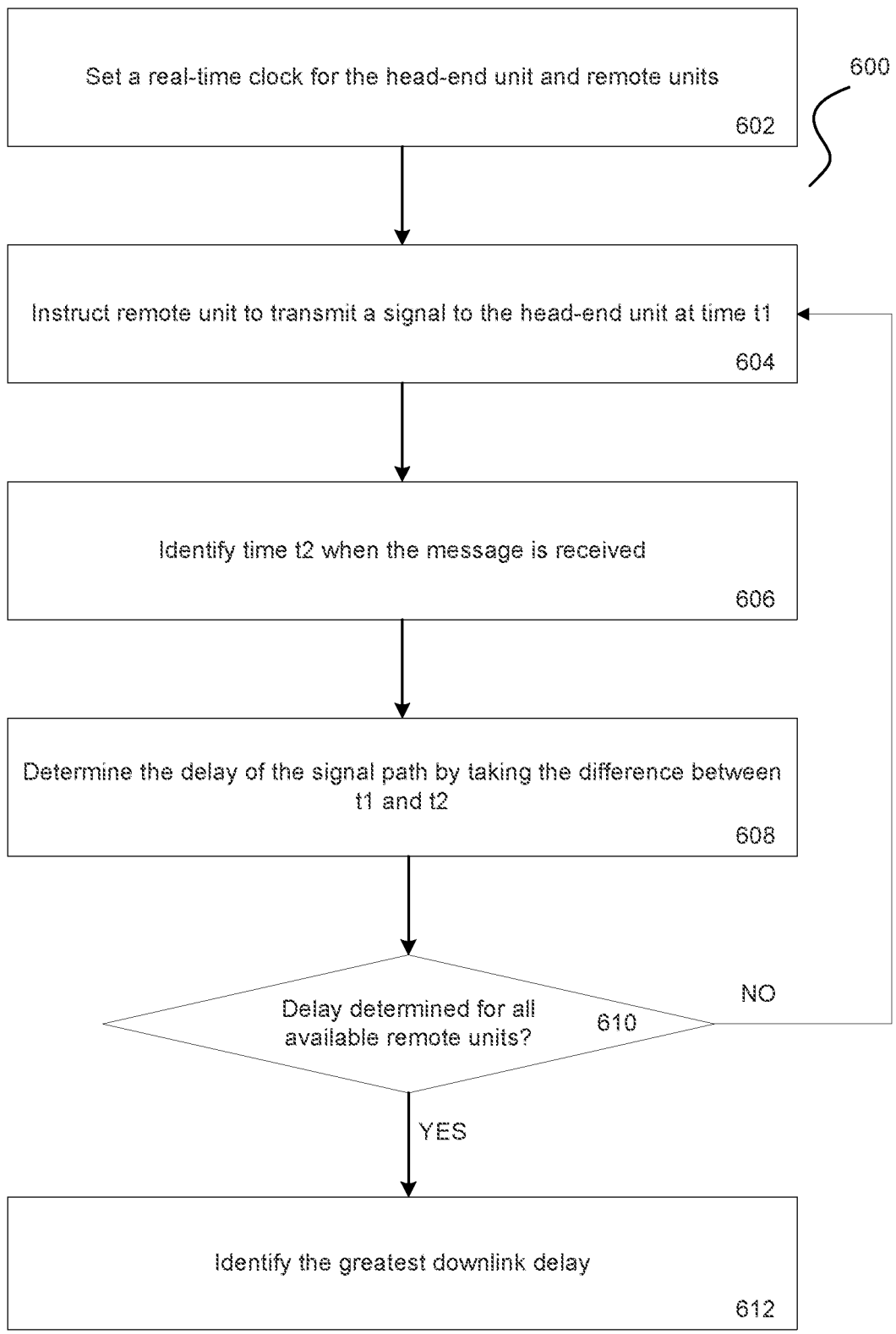
FIG. 6 shows a flow chart of a process for identifying a greatest downlink delay according to one aspect of the present disclosure.

FIG. 6 depicts a process 600 for determining the downlink path with the greatest downlink delay. For illustrative purposes, the process 600 is described with reference to the telecommunication unit 400 of FIG. 4, which may be in a head-end unit, a remote unit, or any combination of suitable devices in a telecommunication system. But other implementations are possible. Furthermore, although FIG. 6 depicts process 600 related to downlink signals along downlink paths, the process 600 may be applied to uplink signals along uplink paths as well.

In block 602, the processing device 402 sets a real-time clock in the head-end unit and remote units. The real-time clocks may be set using an IEEE 1588 protocol, GPS receiver, a time reference received from a connected base station, or another device for synchronizing clocks between networked devices. In alternative examples, the real-time clock may be replaced with a counter.

In block 604, the processing device 402 instructs the remote unit to transmit a message to the head-end unit at a time t1. In some aspects, the processing device may be included in or communicatively coupled to the remote unit and may control the transmission of the message to the head-end unit. In other aspects, the processing device 402 may be included in or communicatively coupled to the head-end unit, or any other unit, and may transmit a signal to the remote unit with instructions to transmit the message. In some aspects, the instructions provided by the processing device 402 may not include the time t1 at which to transmit the message. The instructions may request that the remote unit transmit a message and the transmission time to the processing device 402.

In block 606, the processing device 402 identifies time t2 when the message is received by the head-end unit. In some aspects, the processing device 402 may identify time t2 by being included in the head-end unit and receiving the message directly from the remote unit. In other aspects, the processing device may communicate with the head-end unit and instruct the head-end unit to report the time t2 at which the head-end unit receives the message. In other aspects, the head-end unit may be instructed by the processing device 402 to transmit a signal to the remote unit at time t1. The time t2 may be identified as the time the remote unit receives the signal.

In block 608, the processing device 402 determines the delay of the signal path between head-end unit and the remote unit by taking the difference between t1 and t2. The processing device 402 may also determine the delay by combining the difference between t1 and t2 with known delays associated with processing circuits in the head-end unit, remote unit, or both.

In block 610, the processing device 402 determines if a delay has been identified for all remote units. If not, blocks 604, 606, and 608 are repeated for each remote unit for which a delay has not been identified. If a delay has been identified for all remote units, the processing device 402 proceeds to block 612.

In block 612, the processing device 402 identifies the greatest downlink delay among the remote units by comparing the downlink delay for the signal path associated with each remote unit. The greatest downlink delay may be used such that signals traversing some or all of the other signal paths are delayed to have a delay equal to the greatest downlink delay. In some aspects, the total downlink delay can include the propagation delay determined in block 604 and the delay from either or both of the processing circuits in the head-end unit and remote unit. In other aspects, the total downlink delay can be determined using the propagation delay from block 604 without using the delay from either or both of the processing circuits in the head-end unit and remote unit.

In some aspects, the greatest downlink delay from the set of downlink delays may not be used. For example, the downlink delay for a first downlink path may differ from other downlink delays for other downlink paths by an amount greater than a threshold. Synchronizing the MIMO transmissions using this excessive downlink delay may negatively impact performance of the telecommunication system. If the greatest downlink delay differs from other downlink delays by an amount greater than a threshold, the processing device 402 involved in the synchronization process 400 may select another downlink delay value that is below a threshold for synchronizing MIMO transmissions. The processing device 402 can indicate that the downlink path with the excessive downlink delay should not be used for MIMO transmissions.

Returning to FIG. 5, in block 506, the telecommunication system delays additional downlink signals based on the greatest downlink delay such that the downlink signals are transmitted simultaneously by the remote units. In some examples, a programmable delay is applied to additional downlink signals such that the delay among the downlink paths is the same. The programmable delay can be implemented in one or more devices in a downlink path. In some aspects, a head-end unit can buffer or otherwise delay transmission of one or more signals in a MIMO set. In additional or alternative aspects, a head-end unit can send instructions to other devices in a downlink path (e.g., an expansion unit, a remote unit, etc.) to delay transmission of one or more signals in a MIMO set. For example, a head-end unit can transmit a given MIMO signal to a remote unit with an instruction to delay transmission of the MIMO signal by a specified amount of time.

In some examples, the signals are simultaneously transmitted by remote units to one or more terminal devices in a coverage area of the remote units. Although FIG. 5 depicts a process 500 related to downlink signals along downlink paths, the process may be applied to uplink signals along uplink paths. For example, the process may be applied to uplink signals such that additional uplink signals are transmitted simultaneously by a head-end unit to one or more base stations.

In some aspects, the synchronization process 500 can be performed in response to changes in the telecommunication system. For example, the processing device 402 from FIG. 4 may be involved in the synchronization process and can receive data indicating that a remote unit has been removed from the telecommunication system, that a remote unit has been added to the telecommunication system, or that a remote unit has moved to a different geographic location within a coverage area of the telecommunication system. The changes can impact the downlink delays used for synchronization. The processing device 402 can respond to changes in the telecommunication system by performing the synchronization process 500 using the new telecommunication system configuration.

While the present subject matter has been described in detail with respect to specific aspects and features thereof, it will be appreciated that those skilled in the art, upon attaining an understanding of the foregoing may readily produce alterations to, variations of, and equivalents to such aspects and features. Each of the disclosed aspects, examples, and features can be combined with one or more of the other disclosed aspects, examples, and features. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising:
transmitting signals between a head-end unit and remote units of a telecommunication system;
determining that a first delay of a signal path between the head-end unit and a first remote unit of the remote units is greater than each delay of signal paths between the headend unit and other remote units;
determining if a difference of the first delay from delays in other signal paths is greater than a threshold;
configuring, based on the first delay when the difference between the first delay from the delays in the other signal paths is not greater than the threshold and based on another delay when the difference between the first delay from the delays in the other signal paths is greater than the threshold, the telecommunication system to delay transmission of additional signals such that the additional signals are simultaneously transmitted to another unit by either the head-end unit or the remote units;
wherein the signals comprise Ethernet-framed data representing a set of multiple-input/multiple-output signals;
further wherein determining the first delay is greater than the delay of signal paths between the head-end unit and other remote units includes:
setting a real-time clock for the head-end unit and the remote units;
for each remote unit of the remote units:
transmitting between the head-end unit and the remote unit a message comprising an instruction to transmit a responsive message at a first time,
identifying a second time at which the responsive message is received by the head-end unit or the remote unit,
determining a delay from a difference between the first time and the second time; and
identifying a greatest delay among the remote units.

2. The method of claim 1, wherein the telecommunication system is a distributed antenna system.

3. The method of claim 2, wherein the real-time clock is set using an IEEE 1588 protocol to synchronize Ethernet communications between the head-end unit and the remote units.

4. The method of claim 2, wherein determining the delay for each remote unit also includes combining the delay for each remote unit with a first processing delay caused by processing circuitry of the head-end unit and by a second processing delay caused by processing circuitry of the remote unit.

5. The method of claim 1, wherein configuring the telecommunication system to delay the transmission of the additional signals comprises using a buffer to delay the additional signals.

6. The method of claim 1, wherein the additional signals are additional uplink signals and the additional uplink signals are simultaneously transmitted to base stations by the headend unit.

7. The method of claim 1, further wherein:
when the difference between the first delay from the delays in the other signal paths is greater than the threshold, not using the signal path associated with the first delay to communicate multiple-input/multiple output signals.

8. A telecommunications system comprising:
a plurality of remote units configured to transmit downlink signals to terminal devices and receive uplink signals from the terminal devices;
a head-end unit configured to distribute the downlink signals to the plurality of remote units and receive the uplink signals from the plurality of remote units; and
a processing device configured to:
determine that a first delay of a signal path between the head-end unit and a first remote unit of the plurality of remote units is greater than each delay of the other delays of other signal paths between the head-end unit and other remote units;
determine if a difference of the first delay from the other delays in the other signal paths is greater than a threshold;
instruct, based on the first delay when a difference of the first delay from the other delays is not greater than the threshold and on another delay value when the difference of the first delay from the other delays is greater than the threshold, the telecommunication system to delay the transmission of one of additional downlink signals and uplink signals such that the at least one of additional uplink signals and downlink signals are simultaneously transmitted to another unit by either the head-end unit or remote units; and wherein the processing device is further configured to:
set a real-time clock in the head-end unit and;
implement a physical layer device of the head-end unit to communicate signals using the real-time clock as a time reference;
for each remote unit:
transmit between the head-end unit and a remote unit a message comprising an instruction to transmit a responsive message at a first time;
identify a second time at which the responsive message was received by either the head-end unit or remote unit;
determine a delay from a difference between the first time and the second time; and
identify a greatest delay among the remote units.

9. The telecommunication system of claim 8, wherein the real-time clock is settable using an IEEE 1588 protocol utilized for synchronizing Ethernet communications between the head-end unit and the remote units.

10. The telecommunication system of claim 8, wherein the processing device is further configured to determine a processing delay based on a first processing delay caused by processing circuitry of the head-end unit and a second processing delay caused by processing circuitry of the remote unit.

11. The telecommunication system of claim 8, wherein the processing device is configured to instruct the telecommunication system to delay the transmission of the one of additional downlink signals and uplink signals using a buffer.

12. The telecommunication system of claim 8, wherein the at least one additional downlink signals and uplink signals are simultaneously transmitted to terminal devices by the remote units.

13. The telecommunication system of claim 8, wherein the processing circuit is further configured to:
not use the signal path associated with the first delay to communicate multiple-input/multiple output signals when the difference of the first delay from the other delays is greater than the threshold.

14. A non-transitory computer-readable medium having instructions stored thereon that are executable by a processing device to perform operations, the operations comprising:
determining, based on timestamps included in Ethernet-framed data transmitted between a head-end unit in a telecommunication system and a plurality of remote units, that a first delay of a signal path between the head-end unit and a first remote unit of the plurality of remote units is greater than each of the other delays of other signal paths between the headend unit and other remote units;
determining if a difference of the first delay from the other delays in the other signal paths is greater than a threshold;
when the difference is greater than the threshold, configuring, based on another delay value that is below the threshold, the telecommunication system to delay transmission of additional Ethernet-framed data representing a set of multiple-input/multiple-output signals such that the additional Ethernet-framed data are simultaneously transmitted to another device by either the head-end unit or the remote units; and
when the difference is not greater than the threshold, configuring, based on the first delay, the telecommunication system to delay transmission of additional Ethernet-framed data representing a set of multiple-input/multiple-output signals such that the additional Ethernet-framed data are simultaneously transmitted to another device by either the head-end unit or the remote units.

15. The non-transitory computer-readable medium of claim 14, wherein the operations further comprise:
setting a real-time clock for the head-end unit and the remote units;
for each remote unit:
instructing a message be sent between the head-end unit and the remote unit, comprising an instruction to transmit a responsive message,
identifying a first time at which the responsive message was transmitted by one unit and a second time at which the responsive message was received by the other unit, and
determining a delay from a difference between the first time and second time; and
identifying a largest delay among the remote units.

16. The computer-readable medium of claim 15, wherein setting the real-time clock comprises using an IEEE 1588 protocol utilized for synchronizing Ethernet communications between the head-end unit and the remote units.

17. The computer-readable medium of claim 15, wherein the operations further comprise determining a total delay for each remote unit by combining the delay for each remote unit with a first processing delay caused by processing circuitry of the head-end unit and a second processing delay caused by processing circuitry of the remote unit.

* * * * *